United States Patent [19]
van der Woerd

[11] 3,958,698
[45] May 25, 1976

[54] PIPE BUNDLE EXTRACTING/INSERTING DEVICE

[75] Inventor: Barend van der Woerd, Muiderberg, Netherlands

[73] Assignee: N.V. Machinefabriek Stork-Jaffa, Utrecht, Netherlands

[22] Filed: May 15, 1974

[21] Appl. No.: 470,118

[30] Foreign Application Priority Data
May 21, 1973 Netherlands .................. 7307086

[52] U.S. Cl. ............................. 214/1 P; 29/202 R
[51] Int. Cl.² ..................................... B66F 1/00
[58] Field of Search ............... 214/1 P, 1 PA, 652; 29/157.4, 244, 202 R; 294/88, 106

[56] References Cited
UNITED STATES PATENTS

| | | |
|---|---|---|
| 1,401,429 | 12/1921 | Moone ............................. 294/88 X |
| 2,725,618 | 12/1955 | Nygaard ............................... 29/244 |
| 2,857,922 | 10/1958 | Effinger ........................... 214/1 P X |
| 3,125,800 | 3/1964 | Kuma ................................... 29/244 |
| 3,126,103 | 3/1964 | Postlewaite ......................... 214/1 P |
| 3,194,313 | 7/1965 | Fanshawe ........................ 214/2.5 X |
| 3,510,012 | 5/1970 | Van Meteren ..................... 214/1 P |

*Primary Examiner*—Frank E. Werner
*Attorney, Agent, or Firm*—Snyder, Brown and Ramik

[57] ABSTRACT

For withdrawing a bundle of pipes from a heat exchanger and for inserting such bundle the required tractive forces should be exerted on the bundle in a direction in line therewith by means of a key. In order to engage the pipe bundle at its front end and to firmly grip it in a manner that hanging through of the pipes is restricted to an admissible value, the gripper comprises a clamp having at least two clamping jaws adapted to engage the outer circumference of a front flange of the bundle of pipes.

6 Claims, 15 Drawing Figures

PIPE BUNDLE EXTRACTING/INSERTING DEVICE

CROSS REFERENCE TO RELATED APPLICATION

This application is related to copending application Ser. No. 470,119, filed May 15, 1974 and claiming priority under 35 USC 119 to Dutch application No. 7307083 filed May 21, 1973.

A heat exchanger mainly comprising a bundle of pipes and a jacket surrounding said bundle of pipes and having two head covers has to be cleaned occasionally. For this purpose the bundle of pipes is drawn out of the jacket by means of a pipe bundle key and inserted back into it after cleaning.

The invention relates to a pipe bundle key comprising a gripper capable of engaging the bundle of pipes and pulling means being coupled with said gripper and adapted to be moved in the direction of pull on the bundle of pipes.

The known pipe bundle key comprises a gripper mainly consisting of a pull rod or cable which is pushed through a pipe of the bundle of pipes and which hooks by means of a hook attached at its end behind the rear end of the bundle of pipes. Whilst the bundle of pipes is being withdrawn from the jacket with the aid of the pulling means, the bundle of pipes is supported over its length protruding from the jacket from a number, for example, two or three conventional hoisting cranes. Because of the fact that the bundle of pipes is often slack, the danger is great, that owing to an insufficient support during the withdrawal and the insertion back respectively the bundle of pipes bends in such a strong way, that an inadmissible, permanent deformation of pipes appears. This known pipe bundle key has further the disadvantage, that the pull rod or cable can be hardly put through a still polluted pipe of the bundle of pipes.

The invention provides a pipe bundle key improved in this respect in that the gripper comprises a clamp having two clamping jaws adapted to engage the outer circumference of a front flange of the bundle of pipes. This pipe bundle key may be applied without a pull rod or cable put through a pipe of the bundle of pipes. During withdrawing and inserting back respectively of the bundle of pipes the free end of the bundle of pipes is clamped in in the pipe bundle key according to the invention as a result of which the danger of inadmissible bending and the permanent deformation in connection therewith is prevented.

The aforesaid and further features of the invention will be described more fully in the following description of a pipe bundle key embodying the invention with reference to the drawing.

Figure 1:
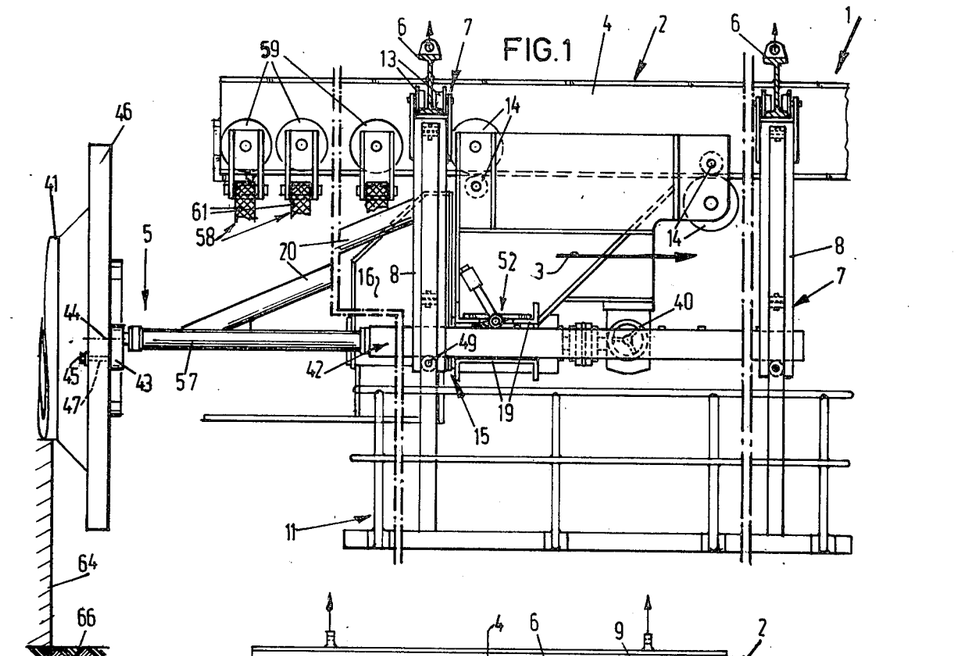
FIGS. 1, 2 and 3 are a side-, front- and a plan view respectively of a preferred embodiment of the device in accordance with the invention.
Figure 2:
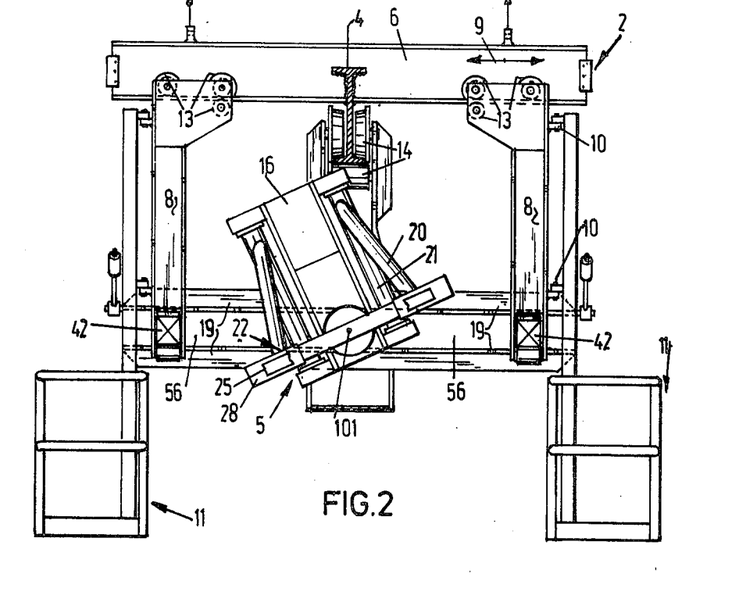
Figure 3:
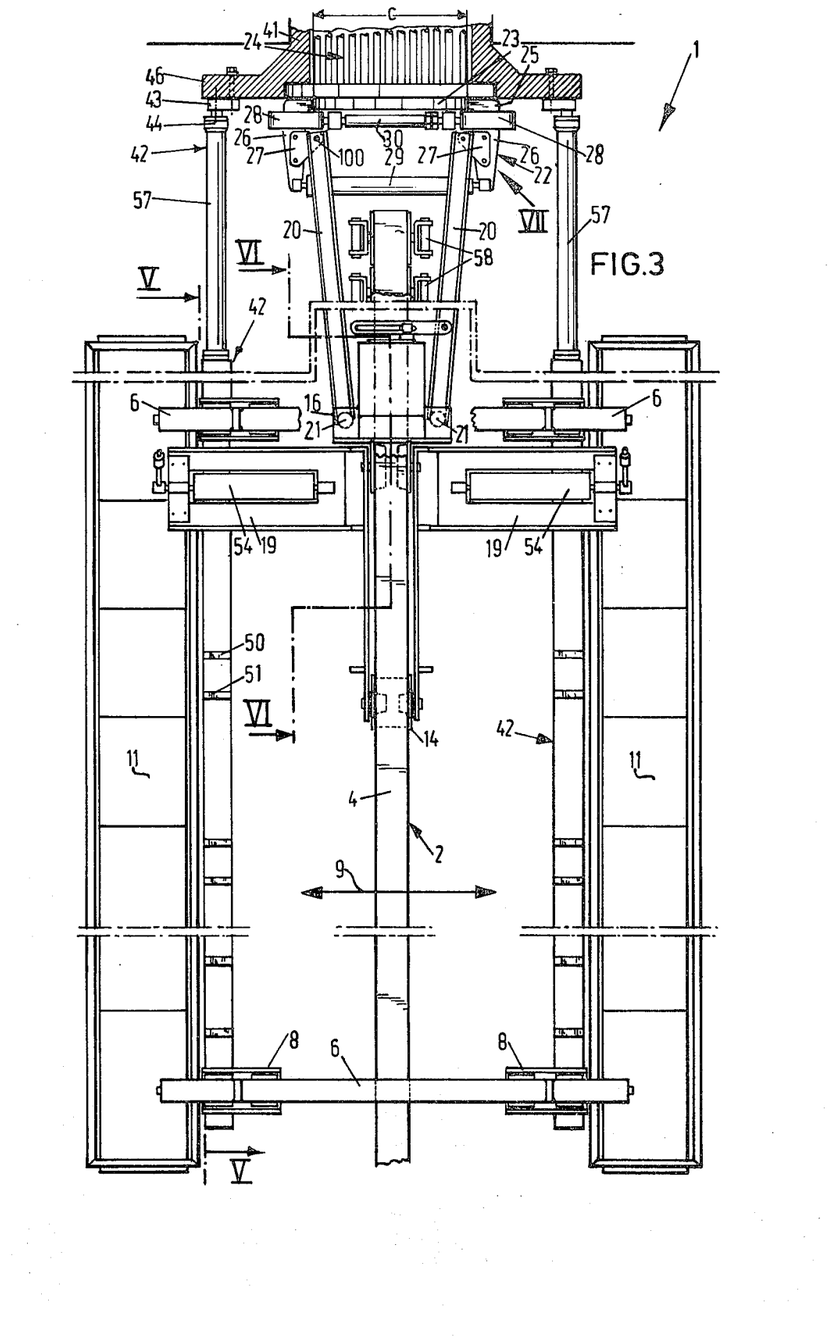
Figure 4:
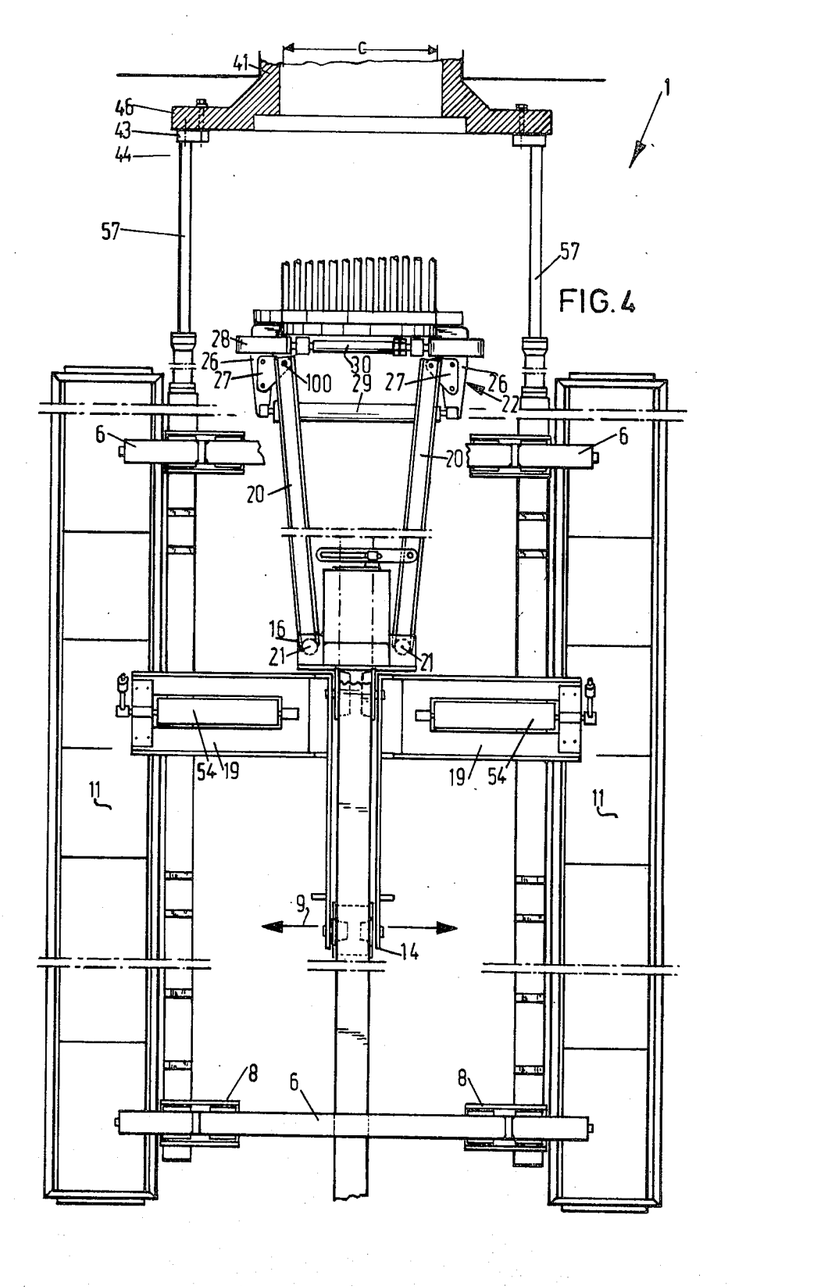
FIG. 4 is a plan view like that of FIG. 3 in a further stage of the withdrawal of a bundle of pipes.

The pipe bundle key 1 embodying the invention comprises a main frame 2 formed essentially by a longitudinal rail 4 extending in the direction of pull 3 of the bundle key 1 for guiding a gripper 5 and by two transverse rails 6, welded to the upper portion of said longitudinal rail 4 for guiding two subframes 7. Each subframe 7 comprises two suspenders 8, which are displaceable by means of rollers 13 in the direction 9 transverse of the pulling direction 3 with respect to the main frame 2 and to which a platform 11 is pivotally suspended by means of hinges 10.

The gripper 5 comprises a gripper carrier 15 suspended by means of rollers 14 to the main frame 2 and having two wings 19 extending in a transverse direction, a gripper frame 16 rotatably journalled by means of a horizontal stub shaft 17 in a bearing 18 of the gripper carrier 15, two arms 20 pivoted to the gripper frame 16 by means of vertical hinges 21 and a clamp 22 pivoted to the arms 20 by means of vertical hinges 100 and having two clamping jaws 25 adapted to engage the outer circumference of a front flange 23 of a bundle of pipes 24.

Figure 7:
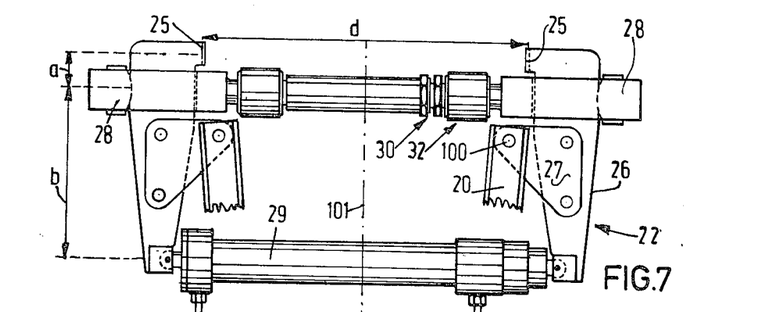
FIG. 7 shows on an enlarged scale a detail VII in FIG. 3, relating to the gripper.
Figure 8:
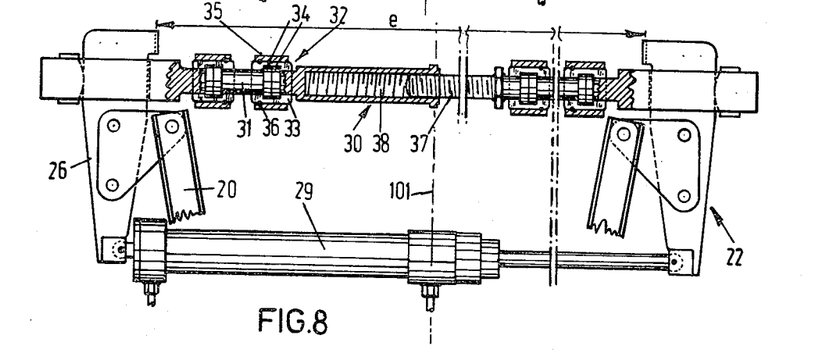
FIG. 8 shows a detail like FIG. 7 relating to the gripper adjusted to a larger gripping width.
Figure 9:
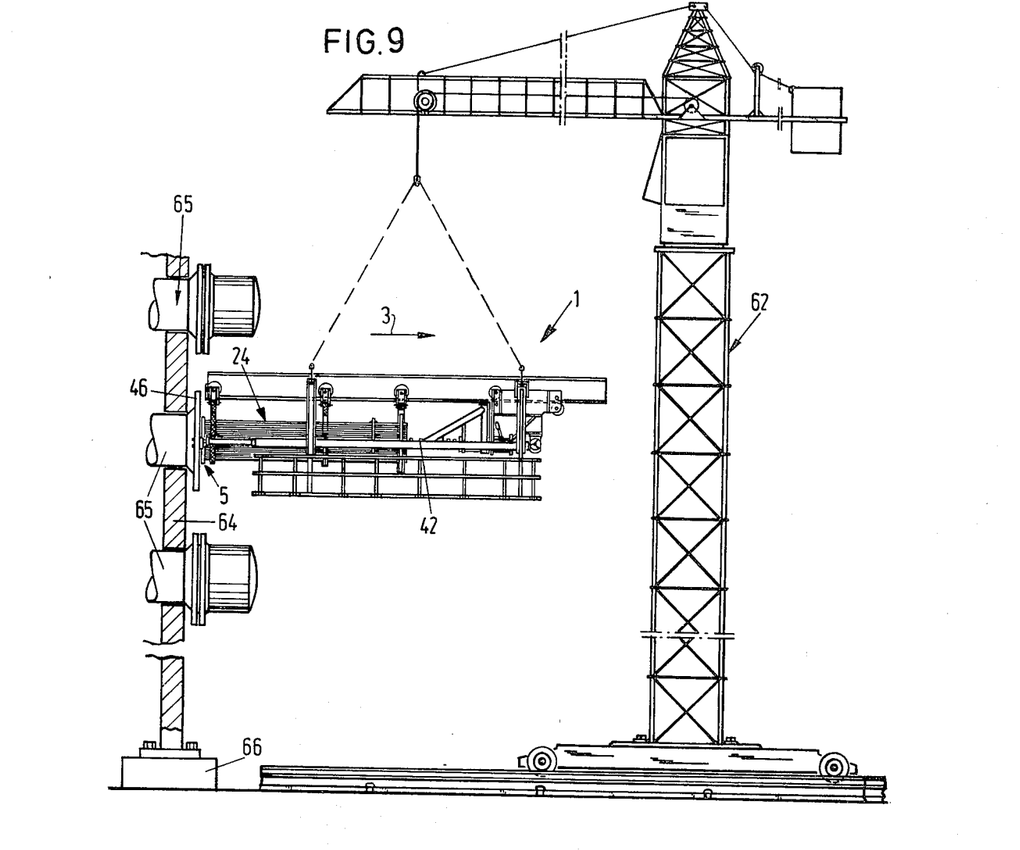
FIG. 9 shows on a reduced scale a diagram for the use of the device shown in FIG. 1 in combination with a conventional lifting device.

The clamp 22 comprises two levers 26 suspended by plates 27 to the arms 20 and having the clamping jaws 25 at the front ends and supports 28 in close proximity thereof. The levers 26 are pivotally journalled in the supports 28 and are actuated by a strong hydraulic screw jack 29. The arm $a$ between the clamping jaw 25 and the support 28 is materially shorter than the arm $b$ between the support 28 and the screw jack 29.

The supports 28 are interconnected by means of a pulling rod 30 of adjustable length in order to adapt the clamp 22 to various diameters $c$ of the front flanges 23 of pipe bundles 24. The large diameter variations are compensated for stepwise by means of one or more coupling pieces 31, each coupled at both ends with the pulling rod 30 by means of a coupling 32. Each coupling 32 comprises a sleeve 33 divided in the longitudinal direction into halves and surrounding the flanges 34 to be coupled with one another and a sleeve 35 slipped onto the former and secured against an axial displacement with the aid of a circlip 36. The smaller diameter variations are compensated for by means of a screw rod 37, which can be screwed to a greater or lesser extent into a screwthreaded sleeve 38. The clamp 22 is adjustable between a minimum gripping width $d$ (FIG. 7) and a maximum gripping width $e$ (FIG. 8).

The stub shaft 17 of the gripper frame is coupled with a screw jack drive 39, which can be actuated by a handwheel 40 for swinging the gripper frame 16 and the clamp 22 about the axial line 101, which is in line with the axis of symmetry of the pipe bundle 24 in the pulling direction 3.

Owing to this rotatability the clamp 22 can be moved into a position in which the clamp jaws 25 can readily engage the front flange 23 of the pipe bundle 24 and, if necessary, when dislodging the pipe bundle 24 a torisonal torque may be exerted by means of the handwheel 40 on the front flange 23.

Figure 5:
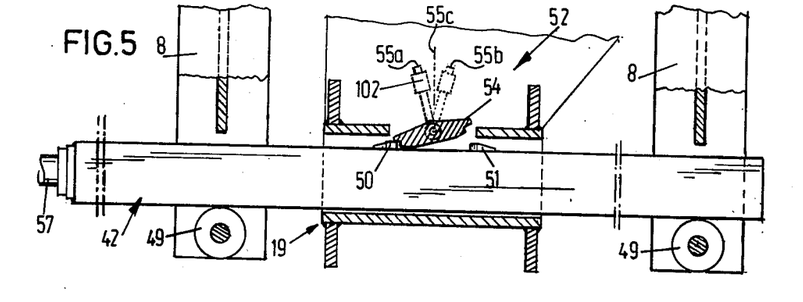
FIGS. 5 and 6 are enlarged sectional views taken on the lines V—V and VI—VI respectively in FIG. 3.
Figure 6:
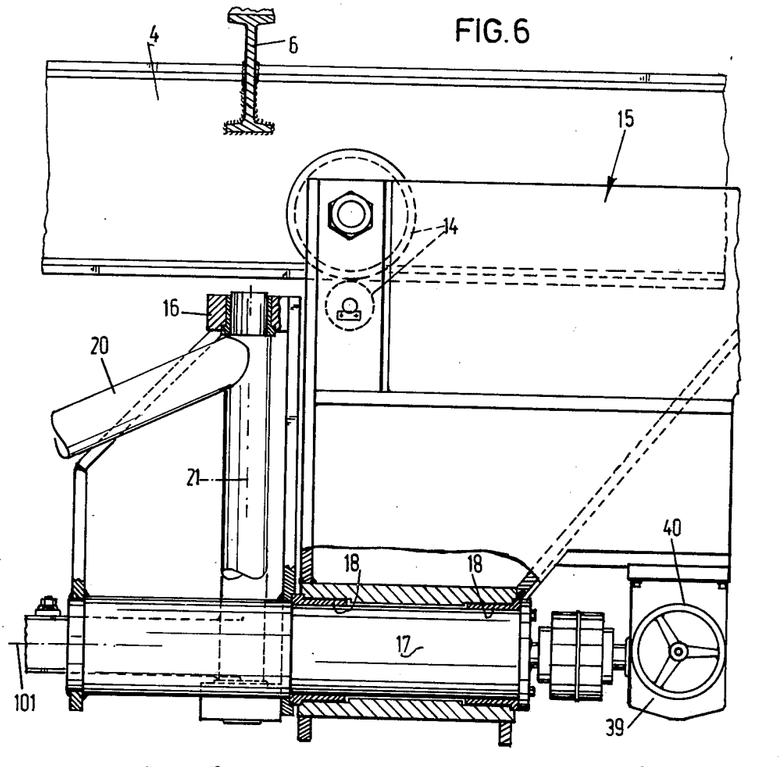

The pulling means of the pipe bundle key 1 embodying the invention comprise two reaction legs 42 adapted to engage a jacket 41 of the pipe bundle 24. Each reaction leg 42 has secured to it a foot 43 adapted to turn about a pivotal shaft 44 and to be readily fastened to a flange 46 of the jacket 41 by means of a bolt 45, which is passed through a hole 47 of the flange 46. In the flange 46 holes for receiving bolts 47 are provided for fastening a cover 48 to the jacket 41, which cover is removed prior to the withdrawal of the pipe bundle from the jacket 41. Each reaction leg 42 is displaceable in the pulling direction 3 and journalled in the two suspenders 8 of a subframe 9 on rollers 49. Each reaction leg 42 has two series of stop cams 50 and 51 and extends through coupling means 52 fastened to a wing 19, with which the reaction leg can be coupled with the gripper 5. Said coupling means 52 comprise a coupling pawl 54 adapted to turn about a shaft 53 and to be set by means of the handle 55 in the position 55a indicated in FIG. 5 by broken lines, in which position the coupling pawl 54 co-operates with a cam 50 during the withdrawal of the pipe bundle 24 from the jacket 41 or in a position 55b indicated by dotted lines, in which the coupling pawl 54 co-operates with a cam 51 during the re-introduction of a bundle 24 into the jacket 41. The coupling means 52 can be discoupled because in the intermediate position 55c of the lever 102 the cams 50 and 51 can freely slide beneath the coupling pawl 54.

Each wing 19 has a slot 56 extending in the transverse direction 9 for passing a reaction leg 42. Since the reaction legs 42 together with the suspenders 8, in accordance with the diameter of the flange 46 of the jacket 41, are set in a given position shifted in the transverse direction 9, each coupling pawl 54 extends in the transverse direction 9 in order to be capable of co-operating in any position of the suspenders 8 with the cams 50 or 51. The pulling means of the pipe bundle key are formed by strong hydraulic screw jacks 57, which are incorporated near the feet 43 in the reaction legs 42.

A plurality of auxiliary carriers 58 for holding the pipe bundle 24 are displaceable in the pulling direction 3 and fastened to the main frame 2, the auxiliary carriers 58 being adapted by rollers 59 to roll along the longitudinal rail 4 on the side of the gripper 5 facing the jacket. Each auxiliary carrier 58 comprises a flexible belt 61 adapted to grip around an intermediate flange 60 of the pipe bundle 24 as soon as the latter emerges from the jacket 41. For this purpose each belt 61 is suspended to the auxiliary carrier 58 at one end directly and at the other end by means of a hydraulic screw jack (not shown) so as to be variable in length. By using these auxiliary carriers 58 the pipe bundle 24 is adequately supported during the whole operation of the withdrawal and the re-insertion out of and into the jacket 41 so that inadmissible, permanent deformations produced by sagging of the pipe bundle 24 are avoided.

During the use of the bundle key 1 the main frame 2 is held by a carriage 68. It will be apparent that during the withdrawal of a pipe bundle 24 the reactive pressure forces exerted by the reaction legs 42 on the flange 46 of the jacket 41 are directed in opposite senses and are in common equal to the pulling force exerted by the gripper 5 on the pipe bundle 24 so that when employing the pipe bundle key 1 in accordance with the invention the frame 64 holding the heat exchangers 65 is not subjected to additional tensile or compression forces so that deformation of the frame 64 and/or tearing the frame 64 from its foundation 66 are avoided.

The main frame 2 is suspended to a rolling frame 67, which is adapted to travel by means of wheels 73 along longitudinal rails 74 of the chassis 75 of the carriage 68 (see FIGS. 10 to 15). The rolling frame 67 comprises two transverse rails 69 supporting each two tackles 71 suspended thereto by means of rollers 70, the hooks 72 of which engage the transverse rails 6 of the main frame 2.

Figures 12, 13, 14:
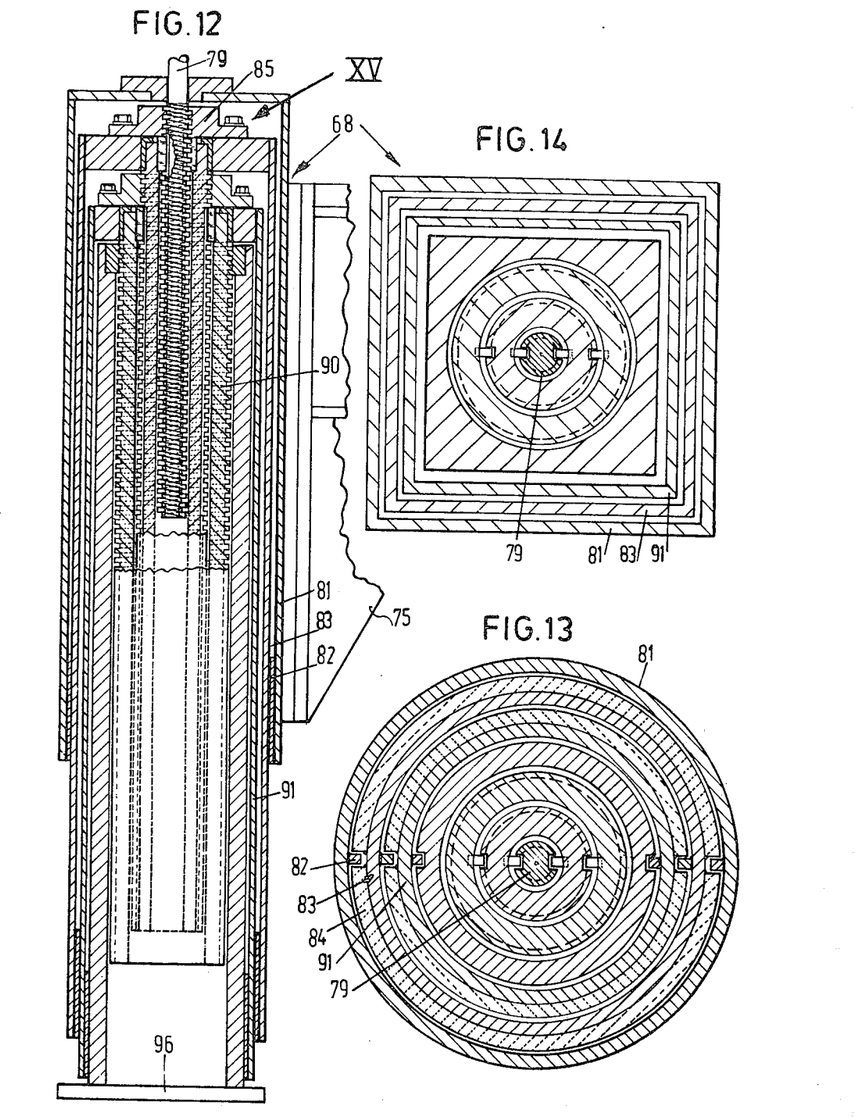
FIG. 12 is an enlarged sectional view taken on the line XII—XII in FIG. 11.
FIG. 13 is an enlarged sectional view taken on the line XIII—XIII in FIG. 12.
FIG. 14 is a variant corresponding to FIG. 13
Figure 15:
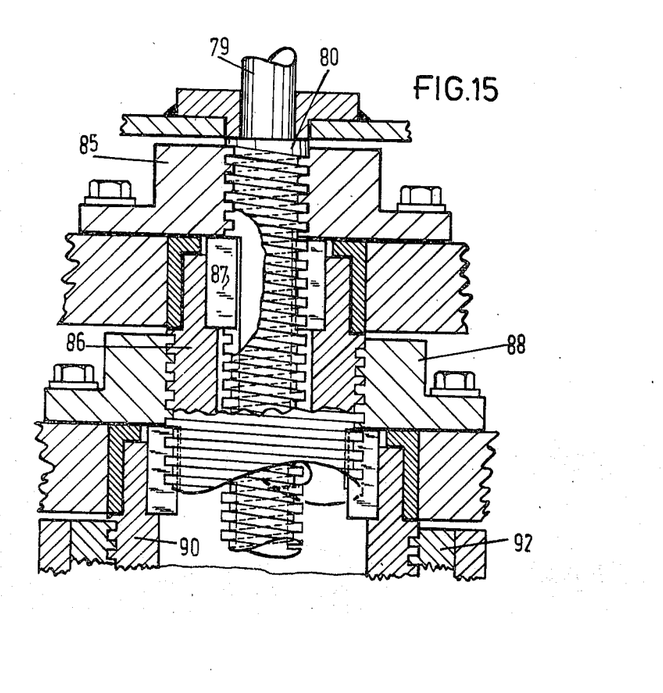
FIG. 15 shows on an enlarged scale the detail XV of FIG. 12.

The carriage 68 comprises telescopic legs 76 preferably consisting of four telescopic tubes 81, 83, 91 and 93 formed by square-section cylinders and relatively guided by means of guide sleeves 63. The top ends of the telescopic tubes 83, 91 and 93 are secured to a nut 85, 88 and 92 respectively. Screw-threaded shafts 79 of the legs 76 are driven in common by a hydraulic motor 77 and a driving gear 78 from a hydraulic pump (not shown). The upper collar 80 of the screw-threaded shaft 79 holds the telescopic tube 81. The screw-threaded shaft 79 is screwed into the nut 85. The screw-threaded shaft 79 is surrounded by a screw-threaded sleeve 86, which is screwed into the nut 88. Likewise the screw-threaded sleeve 86 is surrounded by a screw-threaded sleeve 90, which is screwed into the nut 92. The screw-threaded shaft 79 and the screw-threaded sleeves 86 and 90 are secured against relative turns by means of wedges 87 and 89.

It will be appreciated from FIG. 14 that the telescopic tubes 81, 83, 91 and 93 may have a circular section and may be secured against relative rotations by means of wedges 82. The wedges 82 are welded to the inner sides of the telescopic tubes 81, 83 and 91. To the outer sides of the telescopic tubes 93, 91 and 83 are welded substantially semi-cylindrical dishes 84, which abut against the wedges 82.

A foot plate 96 of each leg bears on a set of caster wheels 97. Prior to the use of the pipe bundle key 1 each leg 76 is fixed to a screw jack 98.

The operation of the pipe bundle key 1 in accordance with the invention is as follows.

Figure 10:
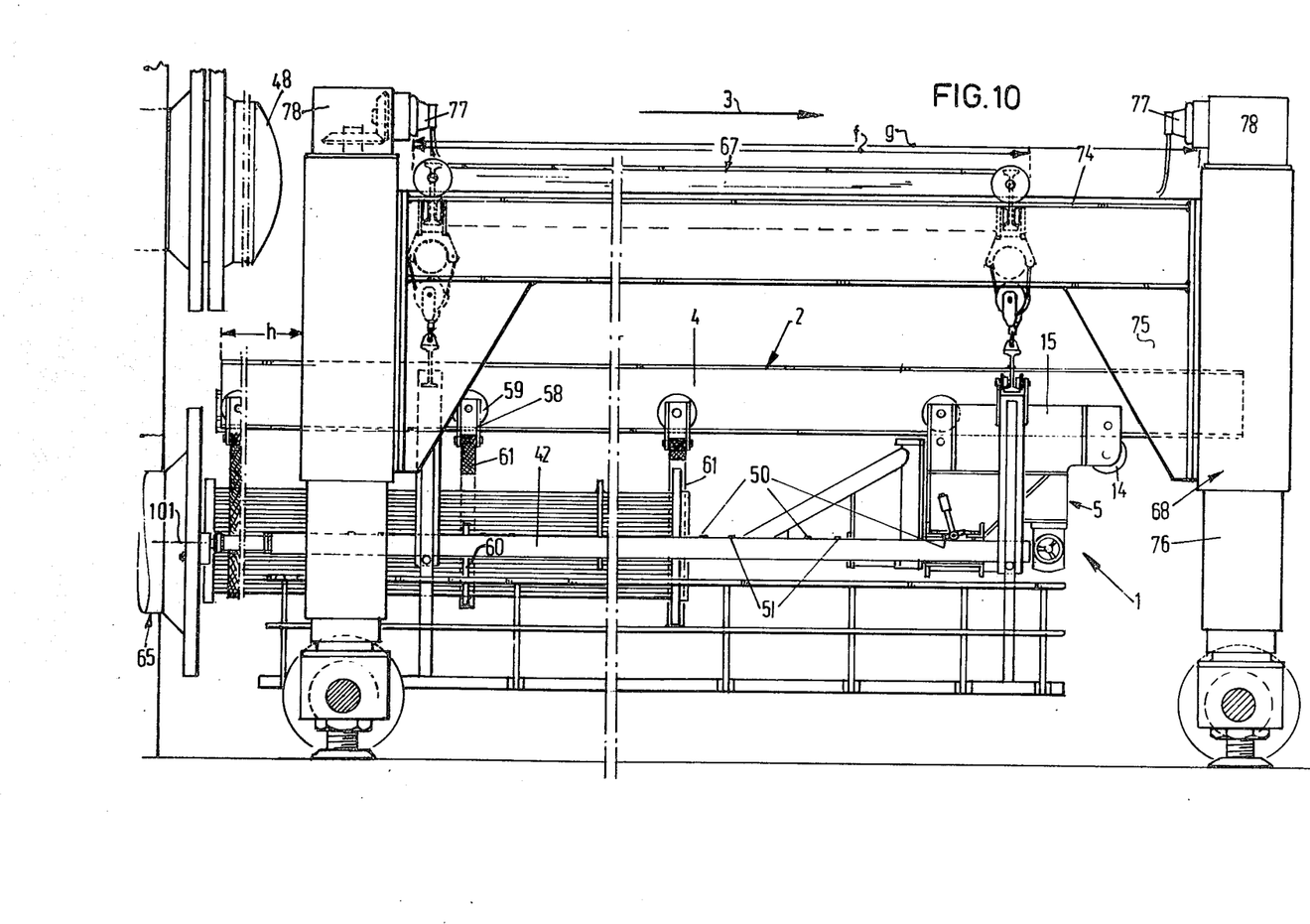
FIGS. 10 and 11 are a side- and a front view of a further developed device of FIG. 1.
Figure 11:
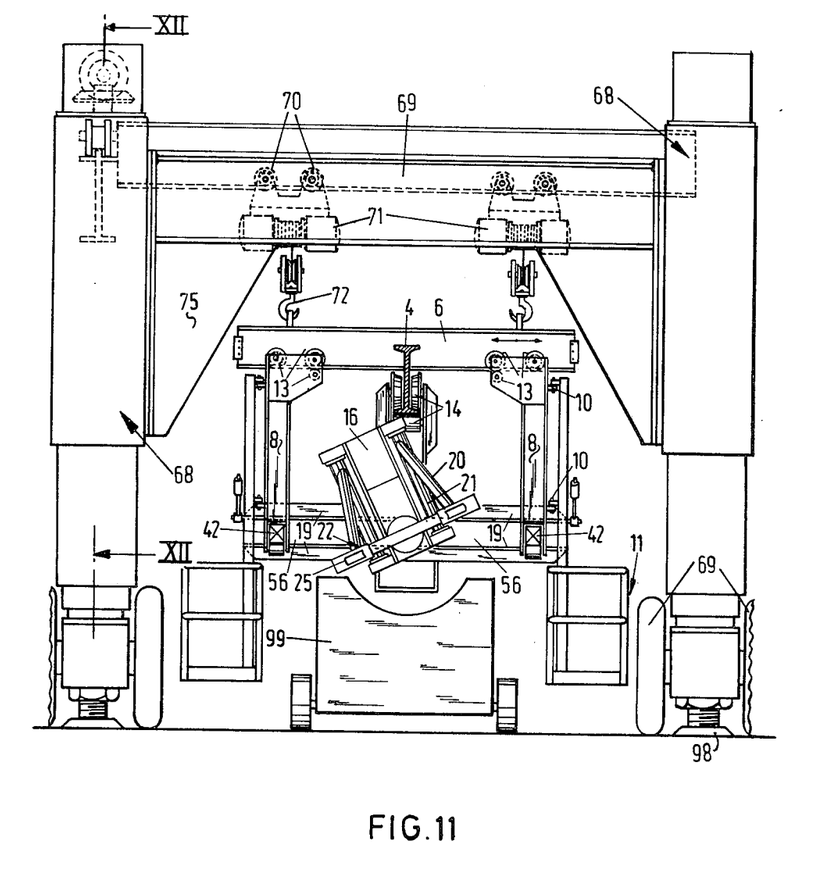

When the pipe bundle 24 of the lowermost heat exchanger 65 shown in FIG. 10 has to be cleaned, the carriage 68 is moved approximately to right in front of said heat exchanger 65, the legs 76 are fixed with screw jacks 98 and the gripper 5 is moved to the level of said heat exchanger 65 by adjusting the length of the telescopic legs 76. The cover 48 is removed from the heat exchanger 65, whilst standing on the platform 11, if required.

During the said and further operations the rolling frame 67 is moved as far as required towards the heat exchanger 65, which is allowed by the length $f$ of the rolling frame 67, which is smaller than the length $g$ of the longitudinal rails 74, the longitudinal rail 4 extending over a length $h$ beyond the carriage 68. This has the advantage that adjacent heat exchangers 65 with covers 48 will not intervene either with the disposition of the carriage 68 or the operation of the gripper 5 and the reaction legs 42. If necessary, the position of the gripper 5 is more accurately adjusted coaxially to the pipe bundle 24 by displacing the tackles 71 in a transverse direction and/or by actuating them for varying the level and/or the direction of the pipe bundle key 1. The clamp 22 is clamped tight to the front flange 23 of the pipe bundle 24 after the pulling rod 30 has been adapted to the diameter of the front flange 23. The reaction legs 42 are fastened to the flange 46 of the jacket 41, for which purpose, if necessary, the suspenders 8 are displaced in a transverse direction. The gripper 5 is coupled by means of the cams 50 and the coupling pawl 54 with the reaction legs 42 and the screw jacks 57 are energized, whilst, as the case may be, a torsional torque is exerted on the gripper 5 by means of the tackles 71 and/or the handwheel 40. When the pipe bundle 24 gets loose and emerges from the jacket 41 by the extension of the screw jacket 57, the gripper 5 moves in the pulling direction 3 along the longitudinal rail 4, until the two screw jacks 57 have reached the ends of their strokes. Then the screw jacks 57 are drawn in after discoupling of the coupling pawls 54. After coupling of the coupling pawls 54 with cams 50 located further to the rear, the next pull is carried out.

As soon as an intermediate flange 60 emerges from the jacket 41 it is suspended to an auxiliary carrier 58. When the pipe bundle 24 is withdrawn completely out of the jacket 41, the reaction legs 42 are disconnected from the flange 46, the rolling frame 67 is displaced as far as possible in the pulling direction 3 and the pipe bundle key 1 is lowered until the pipe bundle 24 bears on a cleaning waggon 99 previously driven to beneath the same. The clamp 22 and the auxiliary carriers 58 are then disengaged from the pipe bundle 24 and if necessary the pipe bundle 24 is conveyed to a cleaning station.

When the pipe bundle 24 is re-inserted into the jacket 41, the pipe bundle 24 lying on the cleaning waggon 99 is gripped by the clamp 22 at the front flange 23 and suspended to the auxiliary carriers 58 and the gripper 5. The pipe bundle 24 is disposed coaxially to the jacket 41 by elevating and positioning the pipe bundle key 1. The reaction legs 42 are fastened to the flange 46 and the pipe bundle 24 is pressed into the jacket 41, the reaction legs 42 then serving as pulling legs, whilst the coupling pawls 54 co-operate with cams 51. In order to move the pipe bundle 24 into the required angular position, the gripper frame 16 is turned by means of the handwheel 40 over the required angle. As a matter of course, the auxiliary carriers 58 are removed from the intermediate flanges 60 just before each intermediate flange 60 disappears in the jacket 41. After the pipe bundle 24 has been located at its place in the jacket 41, the gripper 5 and the reaction legs 42 are disconnected from the heat exchanger 65 and removed, the heat exchanger 65 being again closed by the cover 48. Finally the screw jacks 98 are screwed down and the carriage 68 with the pipe bundle key 1 is removed.

In order to give an idea of the proportions of a pipe bundle key 1 according to the invention the following example may be useful.

The pipe bundle key embodying the invention is specifically suitable for handling pipe bundles 24 of a weight of 5000 to 25,000 kgs. The two screw jacks 57 have a common tractive or compression force of, for example, 10,000 kgs. The pipe bundles 24 to be handled may have a length of, for example, 8 ms or less, in which case the length of the carriage is 9.2 ms. The maximum working height of the pipe bundle key 1 may be 4 to 10 ms. The clamp is adjustable between 0.8 and 2 ms.

The pipe bundle key 1 in accordance with the invention has the advantage that a pipe bundle 24 can be removed without the need for removing the covers 48 of adjacent heat exchangers 65.

What is claimed is:

1. A pipe bundle extracting/inserting device comprising a gripper capable of engaging a bundle of pipes and pulling means coupled with said gripper for moving said gripper along a predetermined axis, the gripper comprising a clamp having at least two clamping jaws adapted to engage the outer circumference of a front flange of the bundle of pipes and means rotatably mounting said clamp for rotation about said axis, said clamp including support means and a pair of levers pivotally engaged between their ends by said support means, said levers being engaged by said support means considerably closer to one end thereof than to the opposite end thereof, a clamping jaw at said one end of each lever, and a jack reacting between said opposite ends of said levers.

2. A pipe bundle extracting/inserting device as claimd in claim 1 wherein said support means comprises a claimed of pivot supports, one for each lever, and pull rod means for adjustably moving said pivot supports toward and away from each other.

3. A pipe bundle extracting/inserting device as claimed in claim 2 wherein said pull rod means comprises a pair of screw-threaded rod members.

4. A pipe bundle extracting/inserting device as claimed in claim 3 wherein said pull rod means also includes separate coupling members whose presence and absence respectively lengthen and shorten said pull rod means.

5. An extractor/inserter for pipe bundles comprising, in combination:
   a main frame including an elongate longitudinal rail;
   a gripper carrier suspended from said rail and movable back and forth therealong;
   a gripper frame rotatably mounted on said gripper carrier about an axis parallel to said rail and projecting forwardly from said gripper carrier;
   a clamp assembly at the forward end of said gripper frame for clampingly engaging a header plate to which a pipe bundle is attached; and
   means for moving said gripper carrier back and forth along said rail to extract and insert a pipe bundle.

6. An extractor/inserter as defined in claim 5 wherein said main frame includes a pair of transverse rails disposed adjacent the forward and rearward ends of said longitudinal rail;
   a pair of subframes suspended from said transverse rails, one on each side of said longitudinal rail, and a horizontal reaction leg mounted in each subframe and projecting forwardly from the main frame;
   said gripper carrier including opposite side extensions engaging a reaction leg at each side thereof, and means for releasably locking said gripper carrier to said reaction legs; and
   means for extending/retracting said reaction legs, each reaction leg being adapted to bear against and be connected to the header plate whereby said means for extending/retracting in cooperation with said means for releasably locking consitutes said means for moving the gripper carrier back and forth.

* * * * *